(12) United States Patent
Beck et al.

(10) Patent No.: US 11,075,574 B1
(45) Date of Patent: Jul. 27, 2021

(54) NON-CONDUCTIVE SHAFT GENERATOR

(71) Applicant: Altec Industries, Inc., Birmingham, AL (US)

(72) Inventors: Aaron Beck, Kansas City, MO (US); William Naber, Saint Joseph, MO (US); Timothy J. Mourlam, Kansas City, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/136,482

(22) Filed: Dec. 29, 2020

(51) Int. Cl.
| | |
|---|---|
| *B66F 11/04* | (2006.01) |
| *B66F 13/00* | (2006.01) |
| *H02K 51/00* | (2006.01) |
| *H02K 11/40* | (2016.01) |
| *H02K 7/116* | (2006.01) |
| *H02K 11/30* | (2016.01) |
| *H02K 7/08* | (2006.01) |
| *H02K 11/00* | (2016.01) |
| *H02K 7/00* | (2006.01) |

(52) U.S. Cl.
CPC ............ *H02K 51/00* (2013.01); *B66F 11/046* (2013.01); *B66F 13/00* (2013.01); *H02K 7/003* (2013.01); *H02K 7/08* (2013.01); *H02K 7/116* (2013.01); *H02K 11/0094* (2013.01); *H02K 11/30* (2016.01); *H02K 11/40* (2016.01)

(58) Field of Classification Search
CPC ........ H02K 51/00; H02K 11/40; H02K 7/116; H02K 11/30; H02K 7/08; H02K 11/0094; H02K 7/003; B66F 11/046; B66F 13/00

USPC .................................................... 310/91, 113
See application file for complete search history.

(56) References Cited

U.S. PATENT DOCUMENTS

| | | | | |
|---|---|---|---|---|
| 2,194,822 A * | 3/1940 | Dannheiser | ............ | H02J 9/066 307/64 |
| 5,582,467 A * | 12/1996 | Drolet | ..................... | E21B 7/025 299/33 |
| 5,917,248 A * | 6/1999 | Seguchi | .................. | B60K 6/26 290/31 |
| 6,091,173 A * | 7/2000 | Byrd | ..................... | H02K 11/012 310/85 |
| 6,325,749 B1 * | 12/2001 | Inokuchi | .................... | B25J 5/06 182/2.11 |
| 6,540,473 B2 * | 4/2003 | Inokuchi | .................... | B25J 5/06 318/568.1 |
| 7,609,019 B2 * | 10/2009 | Beck | ....................... | H02J 3/385 318/480 |
| 8,097,967 B2 * | 1/2012 | Hamilton | .................. | H02P 9/46 290/1 A |
| 8,508,058 B2 * | 8/2013 | Hamilton | .................. | H02J 3/32 290/1 A |
| 10,381,871 B2 * | 8/2019 | Ludois | .................... | F16C 19/54 |
| 2001/0055525 A1 * | 12/2001 | Inokuchi | ............... | B66F 11/046 414/800 |

(Continued)

*Primary Examiner* — John K Kim
(74) *Attorney, Agent, or Firm* — Erise IP, P.A.

(57) ABSTRACT

A device, system, and method for providing electrical power to an electrically isolated region utilizing an electrically insulating drive shaft to transmit rotational energy over an electrically isolated gap to an electrical generator disposed in the electrically isolated region. Electrical power generated by the generator is used to power at least one electronic device in the electrically isolated region or to charge a battery, while maintaining electrical isolation.

20 Claims, 7 Drawing Sheets

(56) References Cited

U.S. PATENT DOCUMENTS

| | | | | |
|---|---|---|---|---|
| 2013/0020972 | A1* | 1/2013 | Ito | H02M 7/48 |
| | | | | 318/400.3 |
| 2016/0056693 | A1* | 2/2016 | Klopp | H02K 11/40 |
| | | | | 310/208 |
| 2016/0091061 | A1* | 3/2016 | Erjavec | F16H 3/724 |
| | | | | 475/2 |
| 2017/0355373 | A1* | 12/2017 | Dalum | B60K 6/48 |

* cited by examiner

NON-CONDUCTIVE SHAFT GENERATOR

BACKGROUND

1. Field

Embodiments of the invention relate to electrical generators. More specifically, embodiments of the invention relate to electrical generators driven by electrically insulating drive shafts.

2. Related Art

Typically, devices used to maintain energized power lines must be electrically isolated from ground and electrically bonded to the energized power lines. In some cases, electronic devices may be used at the electrically isolated region, where electrical power cannot be utilized from a grounded source. Batteries may be used in the electrically isolated region as a source of power for the electronic devices. However, batteries require charging and may run out of power during lengthy operations.

In some cases, solar panels, and hydraulic generators have been used to generate electricity at the electrically isolated region, but these power sources are not always reliable. Specifically, solar power relies on direct sunlight and therefore, cannot be used at nighttime or in a shaded area. Similarly, many hydraulic systems are only active when hydraulic power is required, for example, to extend or retract a boom. Thus, hydraulic systems may be powered down and not able to provide power to the hydraulic generator when said hydraulic systems are not actively being used for a primary operation. Further, hydraulic generators typically produce too much power leading to reduced energy efficiency, with hydraulics of smaller size being more difficult to construct and control consistently. Further, hydraulic generators and solar panels take up large amounts of space in the electrically isolated region. In addition, both solar panels and hydraulic generators are temperature dependent and typically require large batteries to enhance reliability, which further sacrifices valuable space in the electrically isolated region.

What is needed is an efficient means for generating electrical power at an electrically isolated region while maintaining electrical isolation to avoid electrical discharge across a dielectric gap. It is also desirable that the means for generating electrical power is reliable and compact such that space in the electrically isolated region is not substantially reduced.

SUMMARY

Embodiments of the invention solve the above-mentioned problems by providing a shaft-generator assembly using an insulating drive shaft to transfer rotational energy to an electric generator disposed at the electrically isolated region.

A first embodiment of the invention is directed to a system for providing power across an electrically isolated gap, the system comprising a first region at a first electrical potential, a second region at a second electrical potential distinct from the first electrical potential, wherein the second region is electrically isolated from the first region, an electric generator disposed in the second region configured to provide electrical power to at least one electronic device, a drive shaft extending between the first region and the second region, wherein at least a first portion of the drive shaft is electrically insulating, said drive shaft being coupled to the electric generator; and a motor disposed in the first region connected to the drive shaft to rotate the drive shaft.

A second embodiment of the invention is directed to an insulating aerial device configured to be attached to a utility vehicle comprising a boom assembly comprising a boom with a distal end and a proximal end, an electric generator disposed near the distal end of the boom configured to provide electrical power, an electrically insulating drive shaft extending across an electrically isolated portion of the boom, wherein the electrically insulating drive shaft is mechanically coupled to the electric generator, and a motor associated with the boom configured to rotate the electrically insulating drive shaft, wherein the motor is electrically isolated from the electric generator.

A third embodiment of the invention is directed to a method for providing power across an electrically isolated gap, the method comprising the steps of driving a motor disposed at a first region to rotate an electrically insulating drive shaft extending to a second region, wherein the second region is electrically isolated from the first region, driving an electric generator disposed at the second region coupled to the electrically insulating drive shaft, and electrically powering at least one electronic device disposed at the second region using the electric generator.

Additional embodiments of the invention are directed to a control system for predicting a load requirement and adjusting a motor power input based on the predicted load requirement.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
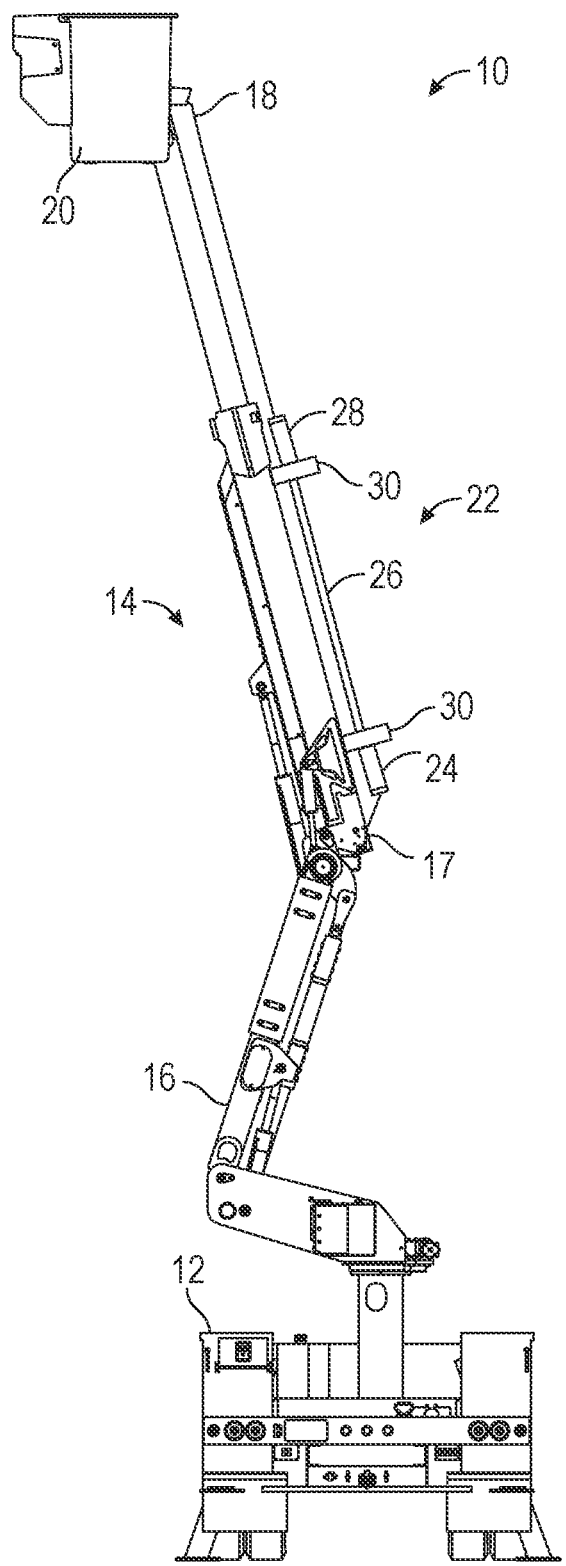
FIG. 1A depicts an insulating aerial device for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1A, an insulating aerial device 10 for some embodiments of the invention is depicted. The insulating aerial device 10, in some embodiments, may be attached to a utility vehicle 12, as shown. The insulating aerial device 10 comprises a boom assembly 14 including a proximal end 16, a middle section 17, and a distal end 18, and an aerial work platform 20. Additionally, the insulating aerial device 10 comprises a shaft-generator assembly 22 disposed on the boom assembly 14 at the distal end 18, as shown. It should be understood that, in some embodiments, the shaft-generator assembly 22 may be disposed at different locations with respect to the boom assembly 14. In some embodiments, it may be desirable that the shaft-generator assembly 22 does not take up a large amount of space on the aerial work platform 20. Thus, it may be desirable to dispose the shaft-generator assembly 22 on the boom assembly 14. Here, electrical wires may run from the shaft-generator assembly 22 to the aerial work platform 20, such that the shaft-generator assembly 22 can provide electrical power to an electronic device or battery disposed on or adjacent to the aerial work platform 20. It should be understood that the representation of the shaft-generator assembly 22 shown in FIG. 1A is not to scale and that the components of the shaft-generator assembly 22 are shown larger to increase visibility of said components.

The shaft-generator assembly 22 comprises a motor 24, an electrically insulating drive shaft 26, an electric generator 28, and mounts 30 to support the motor 24, drive shaft 26, and generator 28. In some embodiments, the electrically insulating drive shaft 26 extends across an electrically isolated portion of the boom assembly 14. The electrically isolated portion of the boom assembly 14 may also be referred to as a dielectric gap herein. Here, it is desirable that the drive shaft 26 is non-electrically conductive such that an electric current cannot travel through the drive shaft 26. Accordingly, the drive shaft 26 may be sized based on a rated voltage of the dielectric gap to avoid electrical arcing over the length of the drive shaft 26. The shaft-generator assembly 22 will be discussed in more detail below in reference to FIG. 2A. It should be understood that the insulating aerial device 10 is just one example of a device for which the shaft-generator assembly 22 is used with and that the shaft-generator assembly 22 can be applied to numerous other applications. For example, in some embodiments, the shaft-generator assembly 22 may be disposed on any of a digger derrick, a crane, a jib, a hot line tool, a mechanical tree trimming apparatus, a hydraulic lift, or a robotic work platform. For example, the shaft-generator assembly 22 may be secured to a hydraulic lift used to lift an operator toward a power line. In some embodiments, the shaft-generator assembly 22 may be used on any piece of insulating equipment intended to perform work in a high-voltage environment.

Figure 1B:
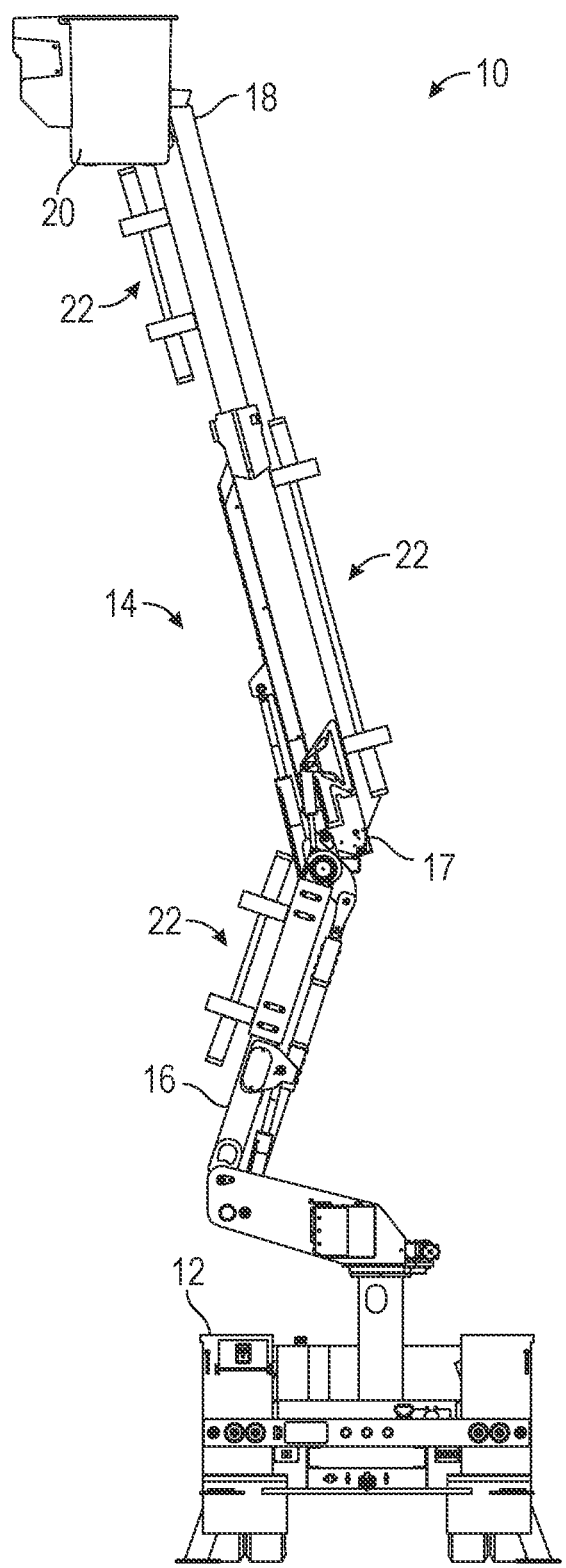
FIG. 1B depicts an insulating aerial device with a plurality of shaft-generator assemblies for some embodiments of the invention.

Turning now to FIG. 1B, an embodiment of the insulating aerial device 10 comprising a plurality of shaft-generator assemblies 22 is depicted. In some embodiments, multiple shaft-generator assemblies 22 may be disposed at various locations along the boom assembly 14. For example, a first shaft-generator assembly 22 may be disposed near the proximal end 16, a second shaft-generator assembly 22 may be disposed near the middle section 17, and a third shaft-generator assembly 22 may be disposed near the distal end 18, as shown. However, it should be understood that, in some embodiments, a different number of shaft-generator assemblies 22 may be included and further, that the shaft-generator assemblies 22 may be disposed in any desired location. Additionally, in some embodiments, a single shaft-generator assembly 22 may be provided at any of the locations described herein.

In some embodiments, it may be desirable to include multiple shaft-generator assemblies 22. For example, in applications with multiple electrically isolated regions, a plurality of shaft-generator assemblies 22 may be used to transfer energy to each electrically isolated region. Here, the shaft-generator assemblies 22 may be disposed in series such that the generator 28 of a first shaft-generator assembly 22 powers the motor 24 of the second shaft-generator assembly 22, and so on.

Figure 2A:
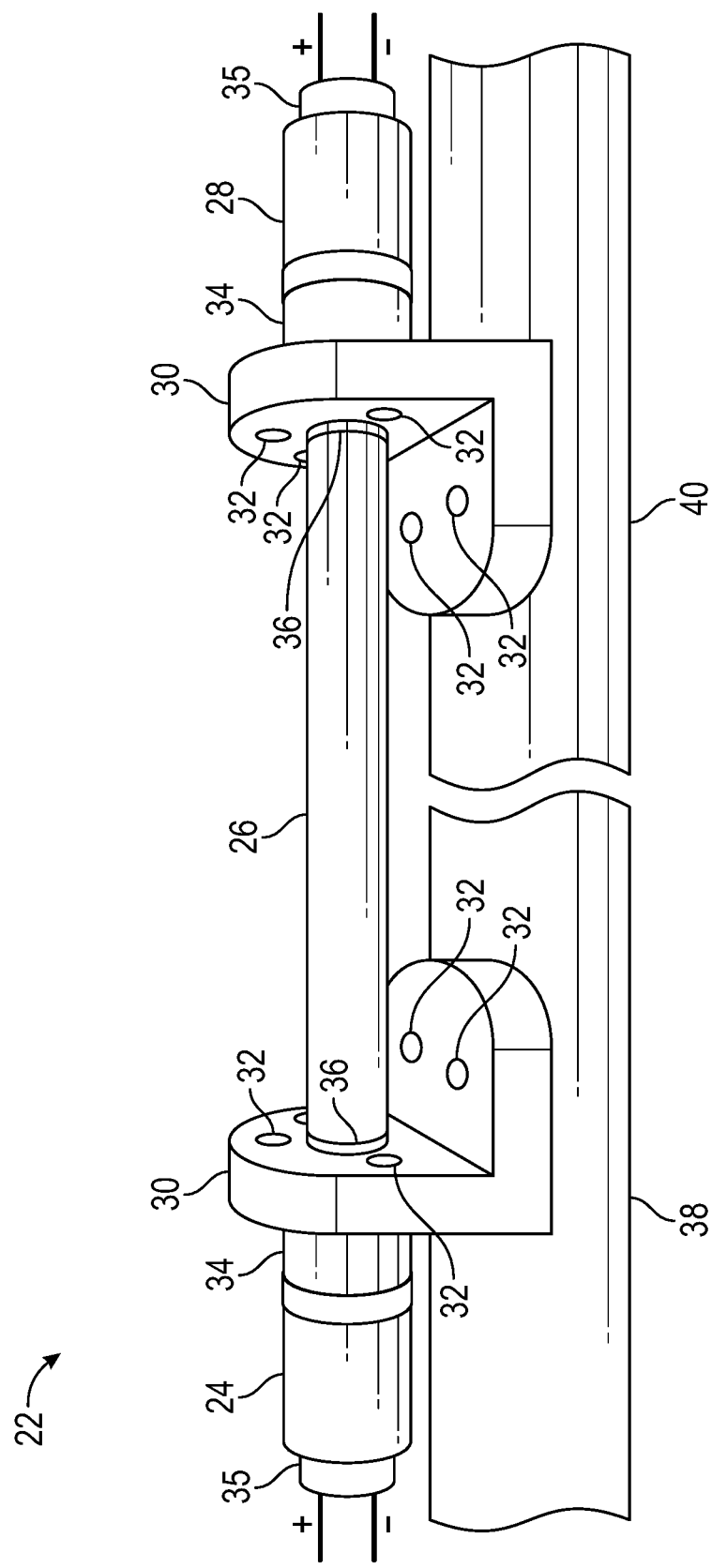
FIG. 2A depicts a shaft-generator assembly for some embodiments of the invention.

Turning now to FIG. 2A, the shaft-generator assembly 22 is depicted relating to some embodiments. As discussed above, the shaft-generator assembly 22 comprises the motor 24, which may be any of an electric motor, a hydraulic motor, a pneumatic motor, or another suitable motor. The output of the motor 24 is coupled to a first end of the drive shaft 26 such that the motor 24 drives rotation of the drive shaft 26. The drive shaft 26 at the opposite end is coupled to the electric generator 28 such that the rotation of the drive shaft 26 rotates a portion of the electric generator 28 to thereby provide power to the electric generator 28. The electric generator 28 converts the mechanical energy from the rotation of the drive shaft 26 into electrical energy. Each of the motor 24, the drive shaft 26, and the generator 28 are supported by mounts 30, as shown.

In some embodiments, the mounts 30 are secured using fasteners 32. Fasteners 32 may be any suitable fastener such as bolts, screws, adhesive, or another type of fastener. The fasteners 32 may be used to secure the mounts 30 to the boom assembly 14 of the insulating aerial device 10 or to another device. Additionally, fasteners 32 may also be used to secure the mounts 30 to any of the motor 24, the drive shaft 26, and the generator 28, as shown. In some embodiments, each of the mounts 30 and the fasteners 32 may be composed of non-conductive materials. For example, the mounts 30 may comprise fiberglass or a hard plastic such that an electrical current cannot pass through the mounts 30.

In some embodiments, some or all of the drive shaft 26 comprises a non-conductive material such as, for example, fiberglass or plastic. Further, in some embodiments, at least one portion of the drive shaft 26 comprises a non-conductive material while another portion of the drive shaft 26 comprises a conductive material, such as a metal material. Here, it may be desirable that the non-conductive portion of the drive shaft 26 is sized and positioned to prevent an electrical current from reaching the conductive material portion. For example, in some embodiments, the drive shaft 26 comprises a first metal end coupled to the motor 24, a second metal end coupled to the generator 28, and a non-conductive middle section. Here, the non-conductive and/or insulated middle section prevents electrical current from traveling from the first metal end to the second metal end, or vice versa. In such embodiments, it may be desirable to include the metal ends for easier coupling to each of the motor 24 and the generator 28.

In some embodiments, at least one gearbox 34 may be included in shaft-generator assembly 22. The gearbox 34 comprises a set of gears and establishes a gear ratio to thereby modify rotation of the drive shaft. In some such embodiments, a gearbox 34 may be included for each of the motor 24 and the generator 28, as shown, where the gears within the gearbox are coupled to an output shaft or input shaft of the motor 24 or the generator 28, respectively. Here, the gearbox 34 may be disposed adjacent to the motor 24 or the generator 28. The gearbox 34 is coupled to the drive shaft 26 such that rotation of the drive shaft 26 and the gears within the gearbox 34 is coupled. Accordingly, the motor 24 is powered such that the output shaft of the motor 24 is rotated causing rotation of the gears within the gearbox 34 coupled to the motor 24. The gearbox 34 coupled to the motor 24 drives rotation of the drive shaft 26. When the drive shaft 26 is rotated, gears within the gearbox 34 coupled to the generator 28 are rotated and drive rotation of the input shaft of the generator 28. Accordingly, the motor 24 provides rotational power to the drive shaft 26, which is transferred to the generator 28 and converted to electrical power by the generator 28.

The gear ratio of each of the gearboxes 34 is selected to modify the rotational speed and torque of the drive shaft 26. In some embodiments, it may be desirable to modify the speed of the drive shaft 26 to provide a safe rotation speed and to reduce vibration to prevent damage to the drive shaft 26. Further, a given gear ratio may be associated with a specific efficiency. As such, it may be desirable to select a gear ratio that distributes a high efficiency at a given input voltage. For example, in some embodiments, a gear ratio of 27:1 may be used such that the rotational speed of the drive shaft 26 is relatively low and the efficiency is relatively high. In such embodiments, efficiency relates to the ratio of output power to input power. In some embodiments, each gearbox 34 comprises a plurality of gears and bearings disposed within a housing of the gearbox 34. The components of the gearbox 34 may additionally be lubricated and sealed to avoid outside contact or leaking of the lubricant.

In some embodiments, each of the motor 24 and the generator 28 comprise electrical terminals 35. The electrical terminals 35 may be disposed on the motor 24 to transfer electrical power from a power source to the motor 24. The electrical terminals 35 may be disposed on the generator 28 to transfer electrical power from the generator 28 to power another device. In some such embodiments, the electrical terminals 35 of the generator 28 are used to transfer electrical power to at least one electronic device. For example, the generator 28 may provide electrical power to an electronic device disposed on the aerial work platform 20, such as a sensor or a battery as will be described below. In some embodiments, it may be desirable to include each of the motor 24 and the generator 28 with rated operating voltages of around 12 volts and a rated rotational speed of around 4800 RPM. In some embodiments, the operating voltage of the motor 24 and the generator 28 may be selected from a voltage range of about 10-15 volts. Similarly, in some embodiments, the rated rotational speed of the motor 24 and the generator 28 may be selected from a range of about 3000-6000 RPM. However, it should be understood that other operating voltages and rotational speeds are also contemplated. Further, in some embodiments, a similar component may be used for each of the motor 24 and the generator 28 with the generator 28 connected inversely compared to the motor 24 by reversing the input and output connections. As a result, the output polarity of the generator 28 may be reversed compared to the motor 24.

It should be understood that various power conditions are contemplated for each of the first region 38 and the second region 40. For example, in some embodiments, alternating current may be provided to the motor 24 in the first region 38 at for example, 12 volts, 24 volts, or 48 volts, while alternating current is provided from the generator 28 at the second region 40 at for example, 12 volts, 24 volts, or 48 volts. However, it should be understood that other power conditions are also contemplated. In some embodiments, the power conditions of each of the motor 24 and the generator 28 may be the same or different from each other.

In some embodiments, it may be desirable to increase the number of internal stator windings within either of the motor 24 or the generator 28 to increase the energy efficiency of the shaft-generator assembly 22. Here, the additional stator windings may aid in adequately transferring energy within each of the motor 24 and the generator 28. Specifically, additional stator windings may result in a larger portion of the electrical input energy to the motor 24 being converted into rotational energy at the output of the motor 24 and a larger portion of the rotational energy input into the generator 28 to be converted into electrical energy at the output of the generator 28.

Further, in some embodiments, the shaft-generator assembly 22 comprises at least one bearing 36 disposed around the drive shaft 26 to support the drive shaft 26 and reduce vibration. In some such embodiments, bearings 36 may be disposed at each end of the drive shaft 26 and may be secured to the mounts 30, as shown. The bearings 36 reduce vibration by facilitating smooth rotation of the drive shaft 26. In some embodiments, the number of bearings 36 may be selected based on the length of the drive shaft 26. For example, a longer drive shaft 26 may require additional bearings 36 to support the drive shaft 26 and reduce vibration.

In some embodiments, the shaft-generator assembly 22 is distributed across a first region 38 and a second region 40 that is electrically isolated from the first region 38. Here, the first region 38 may be electrically grounded, such as for example by establishing an electrical connection to the surface of the earth, or the earth ground. The second region 40 may not be electrically grounded and may be electrically bonded to a high-power source of electricity. For example, in some embodiments, conductive components of the shaft-generator assembly 22 are electrically bonded to an energized power line. Accordingly, it is desirable that the conductive components in the second region 40 are electrically isolated from the conductive components of the first region 38 to prevent electrical grounding of the second region 40 and a sequential electric shock. In some embodiments, each of the motor 24 and the generator 28 may be conductive components capable of transferring electricity with the motor 24 being placed in the first region 38 and the generator 28 being placed in the second region 40, as shown. Accordingly, it is desirable to electrically isolate motor 24 and generator 28 by disposing the electrically insulating drive shaft 26 between them. It is also desirable that the drive shaft 26 extends across an electrically isolated region between the first region 38 and the second region 40 to mechanically couple the motor 24 and the generator 28 without providing a path for an electrical current to travel. Accordingly, it is desirable that the drive shaft 26 comprises an electrically insulating material and is not electrically conductive.

It should be understood that, in some embodiments, neither the first region 38 nor the second region 40 are electrically grounded or electrically bonded. In such embodiments, it may still be desirable to electrically isolate the second region 40 from the first region 38 where the first region 38 is at a first electrical potential and the second region 40 is at a second electrical potential that is distinct from the first electrical potential.

Figure 2B:
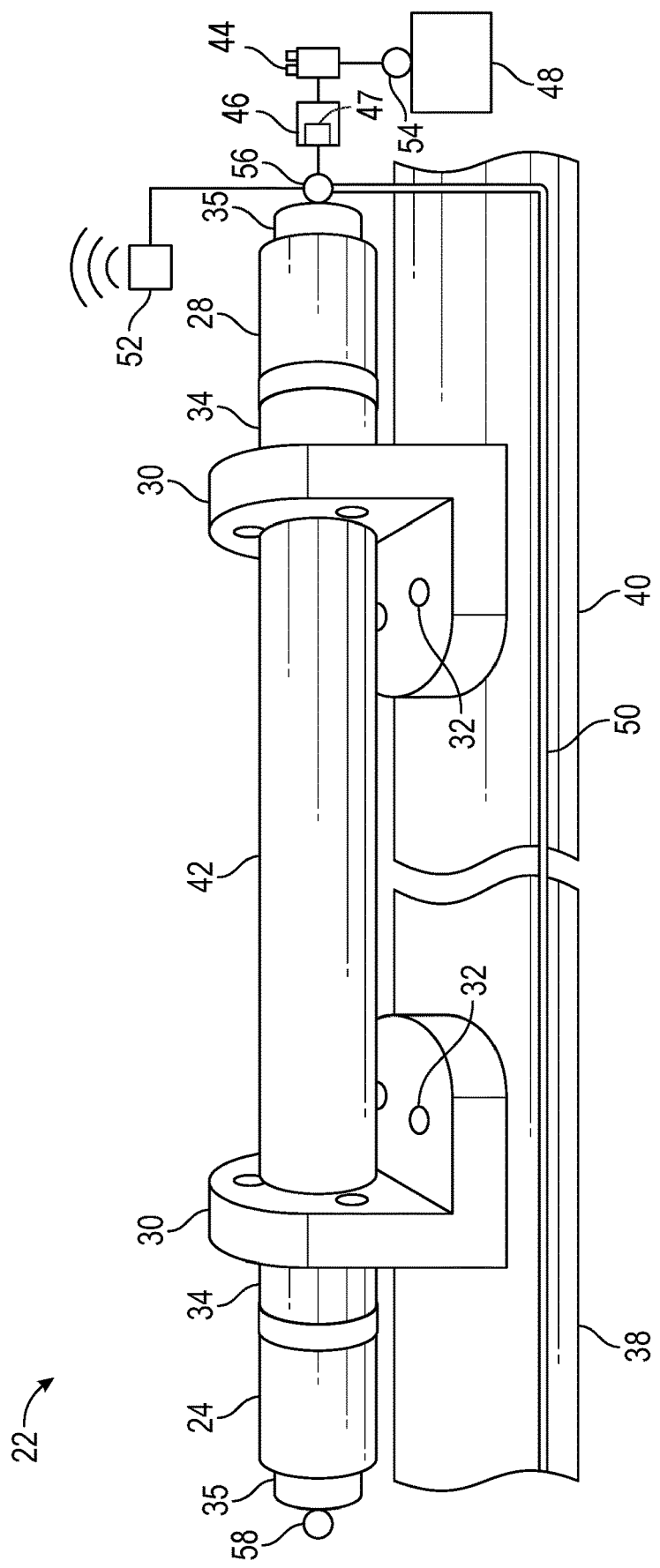
FIG. 2B depicts a shaft-generator assembly including additional accessories for some embodiments of the invention.

Turning now to FIG. 2B the shaft-generator assembly 22 with additional accessories is depicted relating to some embodiments. In some embodiments, the shaft-generator assembly 22 may further comprise a cover 42 surrounding the drive shaft 26. In some embodiments, the cover 42 is disposed over at least a portion of the drive shaft 26, the motor 24, and the generator 28, as shown. In some embodiments, the cover 42 is secured to the mounts 30 or directly to the insulating aerial device 10, such as to the distal end 18 of the boom. The cover 42 prevents damage to the drive shaft 26 and additionally prevents damage to other components by isolating the rotation of the drive shaft 26. In some embodiments, the cover 42 is embodied as a cylindrical sheath surrounding the drive shaft 26 such that the drive shaft 26 is isolated from the outside environment. Accordingly, the cover 42 may also be desirable to protect components of the shaft-generator assembly 22 from weathering and moisture. It should be understood that, in some embodiments, the cover 42 may comprise a different shape and may include openings, holes, or slots therein to reduce heating effects of the shaft-generator assembly 22.

In some embodiments, the shaft-generator assembly 22 further comprises a battery 44 and a battery charger 46, as shown. The battery 44 and battery charger 46 may be electrically coupled to the generator 28 via electrical terminals 35 of the generator 28. The battery charger 46 is configured to provide electrical charging to the battery 44 and, in some embodiments, regulates the amount of electrical power supplied to the battery and converts the output power from the generator 28 to a form usable to power the battery 44. For example, in some embodiments, the power output of the generator 28 may need to be converted to a different form by altering the voltage and/or current such that the battery 44 can be safely charged. In such embodiments, the battery 44 stores power to be consumed by at least one electronic device 48. The electronic device 48 is disposed in the second region 40. In some embodiments, the electronic device 48 comprises at least one of a sensor, an actuator, an alarm, or another device that uses electrical power. Alternatively or additionally, in some embodiments, the electronic device 48 may receive power directly from the generator 28 such that the battery 44 and battery charger 46 may not be required.

In some embodiments, it may be desirable that the battery charger 46 reduces the output voltage and increases the output current of the generator 28 to achieve a suitable output for charging the battery 44. In some embodiments, the battery charger 46 comprises a buck-boost converter 47 with adjustable current and voltage outputs and variable inputs. The buck-boost converter 47 may be desirable to convert the output of the generator 28 to a form usable to charge the battery 44. In some such embodiments, the battery charger 46 may receive a control signal from a controller, such as for example, controller 62 of FIG. 3. Alternatively, battery charger 46 may receive a control signal from an additional controller disposed in the second region 40 or battery charger 46 may include a processor for determining a desired output current and voltage for charging the battery 44 based on a measured battery charge level.

In some embodiments, the shaft-generator assembly 22 further comprises a fiber optic cable 50 for transmitting a feedback signal across a dielectric gap between the second region 40 and the first region 38. In such embodiments, the fiber optic cable 50 may be desirable to transmit a communication signal by using light such that the first region 38 and the second region 40 remain electrically isolated. Alternatively, in some embodiments, other means may be utilized to transmit the feedback signal while maintaining electrical isolation. Such as a wireless transceiver 52 which transmits the feedback signal from the second region 40 to a receiver disposed in the first region 38 or at another location. In some embodiments, the wireless transceiver 52 comprises a radio transceiver operable to communicate over at least one of a WiFi network, a mobile broadband network, or a Bluetooth connection. It should be understood that, in some embodiments, other suitable forms of wireless communication are also contemplated.

In some embodiments, the shaft-generator assembly 22 further comprises a first sensor 54, a second sensor 56, and a third sensor 58. In some embodiments, the first sensor 54 may be disposed in the second region 40 adjacent to the at least one electronic device 48, the second sensor 56 may be disposed in the second region 40 adjacent to the generator 28, and the third sensor 58 may be disposed in the first region 38 adjacent to the motor 24. Accordingly, in some such embodiments, the first sensor 54 may measure a power requirement of the at least one electronic device 48 in the second region 40, the second sensor 56 may measure at least one parameter in the second region 40, such as for example the output voltage and current of the generator 28, and the third sensor 58 may measure at least one parameter of the motor 24 such as for example, the input voltage and current of the motor 24 or the output power of the motor 24. In some embodiments, the first sensor 54 and the second sensor 56 are powered by the generator 28. In such embodiments, it may be desirable to measure parameters such as input voltage and current and an output voltage and current to predict power requirements or to monitor the energy efficiency of the shaft-generator assembly 22. Further, in some embodiments, data from the first sensor 54 and the second sensor 56 are used as feedback control parameters to control the input power to the motor 24, as will be discussed below in reference to FIG. 3. In some embodiments, a signal measured by the second sensor 56 is sent back to the first region 38 via the fiber optic cable 50.

Figure 3:
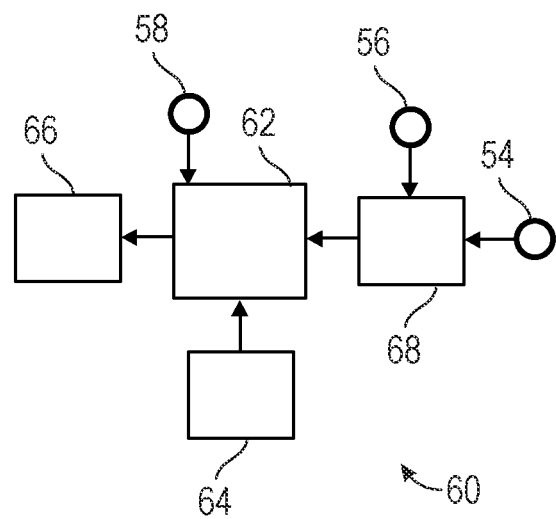
FIG. 3 depicts a control system for some embodiments of the invention.

Turning now to FIG. 3, a control system 60 for controlling the power input to the motor 24 is depicted relating to some embodiments. The control system 60 comprises a controller 62, a power source 64, a motor power input 66, a feedback connection 68, as well as the first sensor 54, the second sensor 56, and a third sensor 58. In some embodiments, the first sensor 54 and the second sensor 56 may be powered by either of the generator 28 or the battery 44. The first sensor 54 may be employed to measure a parameter within the second region 40, such as, for example, a charge level of the battery 44 or a status of the electronic device 48. The feedback connection 68 may comprise one of the fiber optic cable 50 or the wireless transceiver 52. In some embodiments, the feedback connection 68 carries a signal from at least one of the first sensor 54 and the second sensor 56 in the second region 40 to the controller 62 disposed in the first region 38.

The controller 62 receives signals from each of the first sensor 54, the second sensor 56, and the third sensor 58 to determine a desired target value for the generator 28. Here, the controller 62 adjusts the motor power input 66 according to the received signals to achieve the desired target value at the output of the generator 28. In some embodiments, the controller 62 predicts a power load requirement of the electronic device 48 and adjusts the motor power input 66 based on this prediction. Here, the controller 62 may record prior power requirements of the electronic device 48 to aid in making the prediction. In some embodiments, the controller 62, as well as the third sensor 58 and motor power input 66 are powered by the power source 64. Further, in some embodiments, the motor 24 is also powered by the power source 64. The power source 64 may be a battery or other energy storage device disposed in the first region 38. In some embodiments, the power source 64 is disposed on the utility vehicle 12, such as, for example, in the bed of the utility vehicle 12.

In some embodiments, the controller 62 may adjust the motor power input 66 according to a specific voltage requirement of the electronic device 48, such that the voltage output at the generator 28 matches the voltage requirement of the electronic device 48. For example, if the second sensor 56 returns a signal indicative of an output voltage of the generator 28 around 20 volts, but the electronic device 48 is an actuator that requires 12 volts, then the controller 62 reduces the motor power input 66 such that the generator 28 produces an output voltage of 12 volts. Thus, in such embodiments, the battery 44 and the battery charger 46 may not be required because the generator 28 can automatically match the required output of the electronic device 48. Additionally, the controller 62 may also be operable to match the load requirements of a plurality of electronic devices 48.

In some embodiments, it may be desirable to drive the motor 24 at a particular speed. For example, the controller 62 may adjust the motor power input 66, such that the rotational speed of the motor 24 is reduced. In some embodiments, it may be desirable that the motor rotates relatively slow such that the rotational speed of the drive shaft 26 is also slow. As discussed above, gearbox 34 may be used to adjust the speed of the drive shaft 26 compared to the motor 24. In some embodiments, a gear ratio of 27:1 may be used such that the drive shaft 26 rotates once for every 27 rotations of the motor 24. Accordingly, embodiments are contemplated where the motor 24 is driven at a speed of for example, 1600 RPM, 3200 RPM, or 4800 RPM, while the drive shaft 26 is rotated at a speed of about 60 RPM, 120 RPM, or 180 RPM, respectively. It should be understood, however, that a variety of different rotational speeds and gear ratios are also contemplated. In some embodiments, it is desirable that the drive shaft 26 rotates at a speed of under 60 RPM to increase safety and reduce vibration. In such embodiments, the gearbox 34 may comprise a reduction drive for reducing the rotational speed of the drive shaft 26.

Figure 4A:
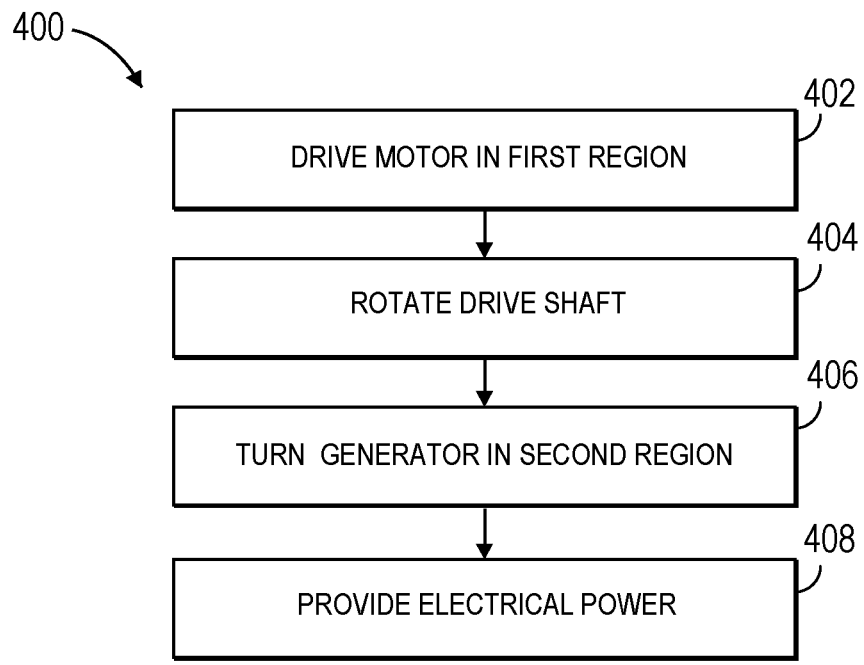
FIG. 4A depicts a method for providing power across an electrically isolated gap for some embodiments of the invention.

Turning now to FIG. 4A, a method 400 for providing power across an electrically isolated gap is depicted relating to some embodiments. At step 402 the motor 24 is driven at the first region 38. Here, the motor 24 may be driven by power source 64, which is also disposed within first region 38. It should be understood that a variety of types of power may be used to drive the motor 24, such as, for example, electrical power, hydraulic power, pneumatic power, or another suitable power delivery method depending on the type of power source and the specific type of motor. In response to driving the motor 24, the drive shaft 26 is rotated at step 404. In some embodiments, the drive shaft 26 is directly coupled to an output shaft of the motor 24 such that when the motor 24 is driven, the drive shaft 26 rotates at the same speed as the output shaft of the motor 24. Alternatively, the drive shaft 26 may be indirectly coupled to the motor 24 through the gearbox 34, such that when the motor 24 is driven, the drive shaft 26 rotates at a different speed than the motor 24. In some embodiments, it may be desirable that the drive shaft 26 rotate at a slower speed than the motor 24.

In response to the drive shaft 26 rotating, the generator 28 is turned at step 406. Here, an input shaft of the generator 28 may be either directly coupled to the drive shaft 26 or indirectly coupled through gearbox 34, as discussed above. When the generator is turned by rotating the input shaft of the generator 28, electrical power is generated. At step 408 the electrical power generated by the generator 28 is provided to at least one of electronic device 48, charger 46, or battery 44.

Figure 4B:
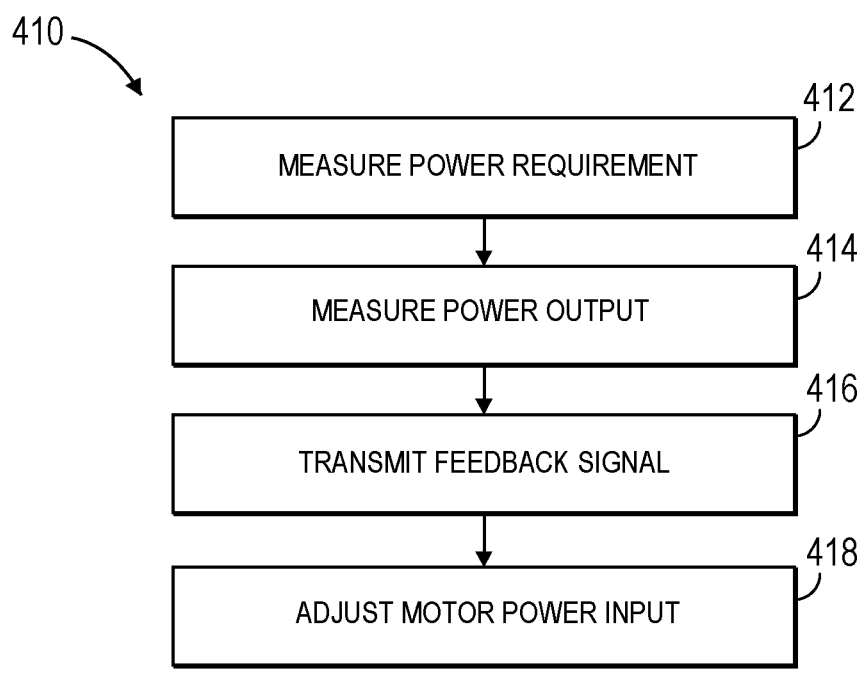
FIG. 4B depicts a method for matching a power load requirement for some embodiments of the invention.

Turning now to FIG. 4B, a method 410 for matching a power load requirement is depicted relating to some embodiments. In such embodiments, it may be desirable to match a power requirement such that electronic devices 48 receive the recommended power, as well as to conserve energy and reduce heat associated with excess electrical power. At step 412 a power load requirement is measured. Here, the power load requirement may be measured using the first sensor 54 disposed adjacent to the electronic device 48. The power load requirement may be the required amount of power to operate the electronic device 48. At step 414 the actual power output of the generator 28 is measured using the second sensor 56.

At step 416 a feedback signal is transmitted using the feedback connection 68, for example, by transmitting a signal through the fiber optic cable 50. In some embodiments, the feedback signal comprises the signals measured by each of the first sensor 54 and the second sensor 56, which are sent to the controller 62. At step 418, after the controller 62 receives the feedback signal, the controller 62 adjusts the motor power input 66 based on the feedback signal. For example, if the feedback signal indicates that the power requirement measured at the first sensor 54 is higher than the actual generator output measured at the second sensor 56, then the controller 62 may increase the motor power input 66 such that the generator output is increased. Alternatively, if the feedback signal indicates that the power requirement is lower than the actual generator output, then the controller 62 may decrease the motor power input 66 to reduce the generator output and thereby conserve power.

In some embodiments, the feedback signal comprises a charge level of the battery 44 measured by first sensor 54. In such embodiments, the controller 62 may adjust the motor power input 66 based on the battery charge level received from the feedback connection 68. In such embodiments, it may be desirable to consider the battery charge level such that the battery 44 is not over charged as well as to optimize charging time.

In some embodiments, it may be desirable that the generator 28 produces about 12 Watts to about 15 Watts of power. However, it should be understood that the power output may vary with each specific application of the shaft-generator assembly 22. For example, if only 10 Watts are required to power the electronic device 48, then the motor power input 66 may be reduced such that the power output of the generator 28 is around 10 Watts. Alternatively, if additional power is required at the second region 40, for example, if an additional electronic device 48 is added, then the motor power input 66 may be increased to support the additional power demand. Additionally, in some embodiments, it may be desirable to closely match a required output power such that excess power is minimized to reduce the heating associated with excess power.

It is also desirable that the shaft-generator assembly 22 is substantially independent of operating temperature such that the shaft-generator assembly 22 may be employed in a variety of operations regardless of the temperature of the environment. Unlike, solar and hydraulic power generation means, which rely heavily on a narrow range of operating temperatures, an electric motor may be operated effectively at a wide range of temperatures. Accordingly, it may desirable that motor 24 runs on electrical power to avoid issues such as the temperature dependence of hydraulic fluid viscosity and solar power generation.

It is also desirable that the shaft-generator assembly 22 is substantially independent of operating mode of the machine, such that energy or fuel consumption can be reduced when in use. This also acts to reduce noise pollution in many work practices.

Figure 5:
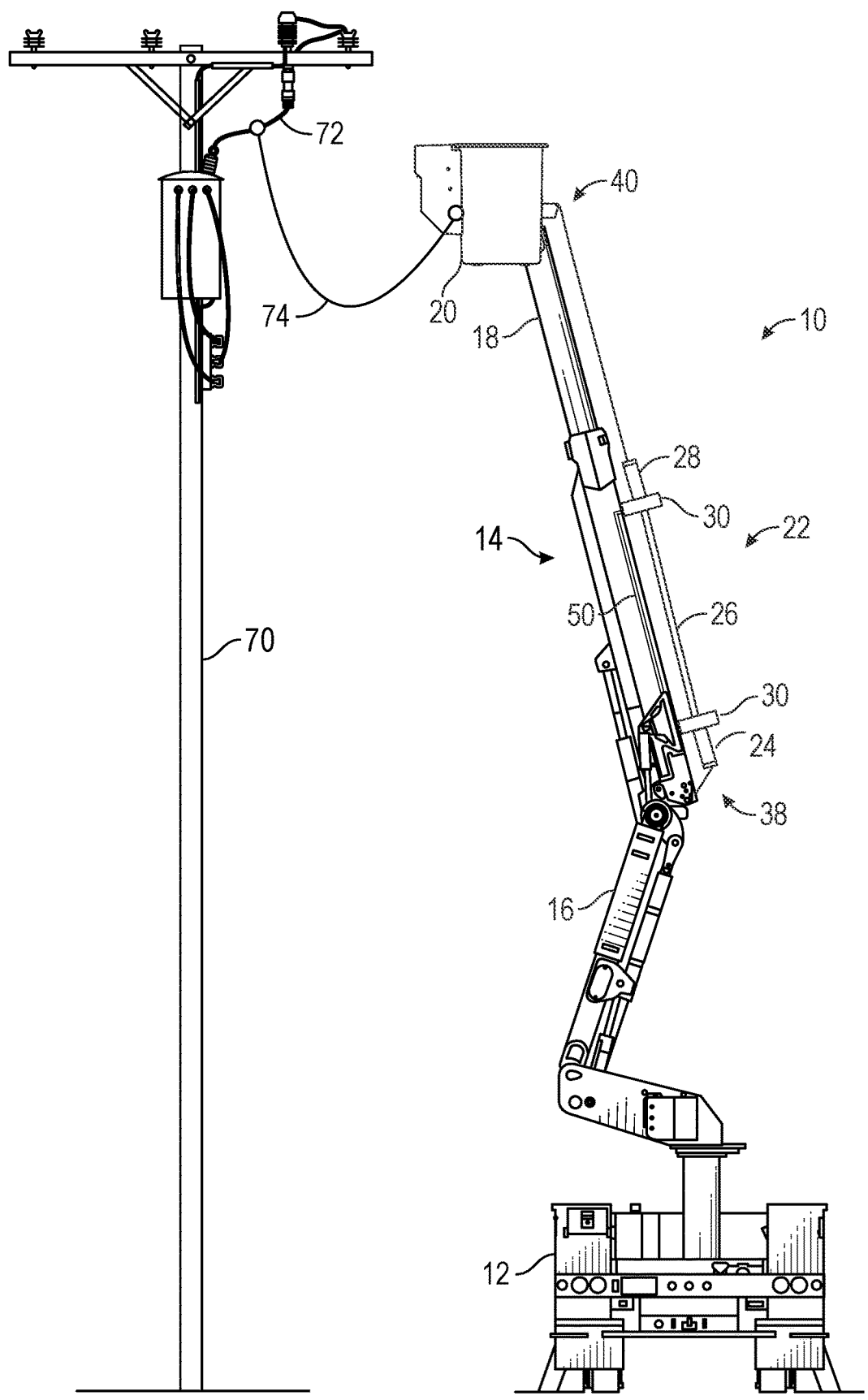
FIG. 5 depicts an exemplary operational environment of an insulating aerial device with a shaft-generator assembly for some embodiments of the invention.

Turning now to FIG. 5, an exemplary operational environment of the shaft-generator assembly 22 is depicted relating to some embodiments. Here, the shaft-generator assembly 22 is secured to the boom assembly 14 of insulating aerial device 10 which is positioned adjacent to a utility pole 70 supporting an energized power line 72. In such embodiments, the boom assembly 14 may be used to lift an operator standing on the aerial work platform 20 and position the platform 20 next to the energized power line 72. Accordingly, the operator may perform maintenance operations on the energized power line 72. Before performing any work on the energized power line 72, it is desirable to electrically bond conductive components of the insulating aerial device 10 at or near the aerial work platform 20 and the distal end 18 of the boom assembly 14 to the energized power line 72 to hold the conductive components at the same electrical potential as the energized power line 72. In some embodiments, the conductive components comprise a tip of the boom assembly 14, a portion of the aerial work platform 20, a platform rotator supporting the platform 20, and a leveling bracket used to level the platform 20. Here, a bonding cable 74 may be used to electrically bond the conductive components to the energized power line 72. For example, the bonding cable 74 may be secured to the energized power line 72 at one end and secured to the aerial work platform 20 at another end, as shown.

In some embodiments, the generator 28, the battery 44, and the electronic device 48 are also conductive components electrically bonded to the energized power line 72 during operation. Accordingly, it may be desirable to electrically bond all conductive components in the second region 40. In such embodiments, the second region 40 includes the distal end 18 of the boom assembly 14, the aerial work platform 20, and all components disposed thereon. Similarly, the first region 38 may include the proximal end 16 of the boom assembly 14, and the utility vehicle 12. It is desirable that all conductive components of the first region 38 are electrically isolated from the conductive components of the second region 40 such that an electrical current cannot travel between said regions. In some embodiments, fiber optic cable 50 may be disposed on the boom assembly 14 to transfer signals between the first region 38 and the second region 40 while maintaining electrical isolation between the regions. In such embodiments, the fiber optic cable 50 may be disposed on the outside surface of the boom assembly 14, as shown, or internal to the boom assembly 14 to protect the fiber optic cable 50 from the environment.

In some embodiments, the electrical bonding cable 74 may be used to electrically bond the conductive components of the second region 40 to the energized power line 72. The electrical bonding cable 74 may be directly attached to the energized power line 72 via a clamp and secured to one of the conductive components such as, for example, the aerial work platform 20, as shown. Additional bonding cables or wires may be used to establish electrical bonding between the remaining conductive components. For example, wires may run between each of the conductive components to hold said components at a similar electrical potential as that of the energized power line 72.

It should be understood that the exemplary operational environment depicted in FIG. 5 is just one example and that a variety of other use cases are also contemplated. For example, in some embodiments, the second region 40 may not be electrically bonded to the energized power line 72. Further, in some embodiments, the first region 38 may not be electrically grounded. In some such embodiments, each of the first region 38 and the second region 40 may be at electrically floating at various electrical potentials. Here, it still may be desirable to electrically isolated the first region 38 and the second region 40 to prevent electrical current from travelling between them. For example, the first region 38 may be at a first electrical floating potential, while the second region 40 may be at a second electrical floating potential higher than the first electrical floating potential such that a voltage differential is created between the two regions.

The insulating aerial device 10 with the shaft-generator assembly 22 may be used in different exemplary scenarios. In a first scenario, the first region 38 is electrically grounded while the second region 40 is at a floating electrical potential. In a second scenario, the first region 38 (including the motor 24) is at a first floating electrical potential while the second region 40 (including the generator 28) is at a second higher floating electrical potential. In a third scenario, the first region 38 is electrically grounded while the second region 40 is electrically bonded to a high-voltage source such as the energized power line 72 of FIG. 5, such that the second region 40 is held at the electrical potential of the high-voltage source. In each of the scenarios described above it may be desirable to electrically isolate the first region 38 from the second region 40. In the first and second scenarios, the second region 40 may not be electrically bonded to a high-voltage source.

It should be understood that in some embodiments, the battery 44 is not included. Instead, electrical power is utilized directly from the generator 28. Here, the shaft-generator assembly 22 may be desirable to eliminate dependence on a battery and relieve the need to charge a battery or rely on another power source. Alternatively, in some embodiments, the shaft-generator assembly 22 may be used as a supplementary power system to the battery 44 or to charge the battery 44 when the charge level becomes low.

It should be understood that alternative solutions to the problems recited herein are also contemplated. For example, in some embodiments, a non-conductive belt or chain may be used in place of the drive shaft 26 such that the belt transfers rotational power from the motor 24 to the generator 28. In such embodiments, the belt may be placed around the output shaft of the motor 24 at one end and placed around the input shaft of the generator 28 at another end. Alternatively, in some embodiments, the belt may be placed around a wheel coupled to the gearbox 34. In some embodiments, it may be desirable that the belt or chain comprises electrically insulating properties such that electrical current does not pass through the belt or chain.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing power across an electrically isolated gap, the system comprising:
    a first region at a first electrical potential;
    a second region at a second electrical potential distinct from the first electrical potential, wherein the second region is electrically isolated from the first region;
    an electric generator disposed in the second region configured to provide electrical power to at least one electronic device;
    a drive shaft extending between the first region and the second region, wherein at least a first portion of the drive shaft is electrically insulating,
    wherein the drive shaft is coupled to the electric generator; and
    a motor disposed in the first region connected to the drive shaft to rotate the drive shaft; and
    a control system for regulating electrical power generated by the electric generator, the control system including:
    a first sensor configured to measure a power requirement of at least one electronic device in the second region;
    a second sensor configured to measure a power output of the electric generator;
    a feedback connection for communicating a feedback signal from the electric generator,
    wherein the feedback signal includes information indicative of the power requirement and the power output; and
    a controller for controlling the motor based on the feedback signal.

2. The system of claim 1, wherein the feedback connection comprises one of a fiber optic cable or a wireless transceiver.

3. The system of claim 1, further comprising a gearbox to modify a rotational speed of the drive shaft.

4. The system of claim 1, further comprising at least one bearing disposed around the drive shaft to support the drive shaft and reduce vibration.

5. The system of claim 1, further comprising the at least one electronic device, wherein the at least one electronic device comprises one of: a sensor, an actuator, a battery, or a combination thereof.

6. The system of claim 1, wherein at least one conductive component within the second region is configured to be electrically bonded to an energized power line on a utility pole, and wherein the first region is configured to be electrically grounded to earth.

7. The system of claim 1, further comprising:
    at least one battery; and
    a battery charger for charging the at least one battery,
    wherein the battery charger is powered by the electric generator.

8. An insulating aerial device configured to be attached to a utility vehicle comprising:
    a boom assembly comprising a boom with a distal end, a proximal end, and at least one electrically isolated portion;
    an electrically insulating drive shaft extending across the at least one electrically isolated portion of the boom, wherein the electrically insulating drive shaft transmits mechanical energy across the at least one electrically isolated portion of the boom via rotation of the drive shaft,
    an electric generator disposed on the boom configured to convert the mechanical energy from the rotation of the electrically insulating drive shaft into electrical power and provide said electrical power to at least one electronic device;
    wherein the electrically insulating drive shaft is mechanically coupled to the electric generator; and
    a motor associated with the boom configured to rotate the electrically insulating drive shaft,
    wherein the motor is electrically isolated from the electric generator.

9. The insulating aerial device of claim 8, further comprising a battery disposed near the distal end of the boom, wherein the battery can be electrically charged by the electric generator.

10. The insulating aerial device of claim 8, further comprising a cover at least partially surrounding the electrically insulating drive shaft to prevent damage.

11. The insulating aerial device of claim 8, further comprising a fiber optic cable to transmit a feedback signal across the electrically isolated portion of the boom.

12. The insulating aerial device of claim 8, further comprising a wireless transceiver to transmit a wireless communication signal across the electrically isolated portion of the boom.

13. The insulating aerial device of claim 8, further comprising the at least one electronic device, wherein the at least one electronic device comprises one of: a sensor, an actuator, a battery, or a combination thereof.

14. A method for providing power across an electrically isolated gap on an aerial device, the method comprising the steps of:
    driving a motor disposed at a first region to rotate an electrically insulating drive shaft extending to a second region,
    wherein the second region is electrically isolated from the first region and said second region is located on a boom assembly of the aerial device;
    driving an electric generator disposed at the second region coupled to the electrically insulating drive shaft, wherein the electric generator is configured to convert mechanical energy from the rotation of the electrically insulating drive shaft into electrical power; and
    electrically powering at least one electronic device disposed at the second region using the electric generator.

15. The method of claim 14, further comprising the steps of:
    predicting a load requirement of the at least one electronic device; and adjusting a power input to the motor based on the predicted load requirement.

16. The method of claim 14, further comprising the step of electrically bonding at least one electrically conductive component at the second region to an energized power line.

17. The method of claim 14, further comprising the step of preventing an electrical current from travelling from the second region to the first region.

18. The method of claim 14, further comprising the steps of:
- measuring a power requirement of the at least one electronic device using a first sensor;
- measuring a power output of the electric generator using a second sensor;
- communicating a feedback signal over the electrically isolated gap to a controller, the feedback signal including information indicative of the power requirement and power output; and
- adjusting a power input to the motor using the controller based on the feedback signal.

19. The method of claim 18, wherein if the power requirement is greater than the power output, the controller increases the power input to the motor.

20. The method of claim 18, wherein if the power requirement is less than the power output, the controller decreases the power input to the motor.

* * * * *